(12) United States Patent
Yang et al.

(10) Patent No.: US 9,340,904 B2
(45) Date of Patent: May 17, 2016

(54) FABRICATION METHOD OF COMPOSITE CARBON NANOTUBE FIBERS/YARNS

(75) Inventors: Duck Joo Yang, Flower Mound, TX (US); Abdelaziz Rahy, Waxahachie, TX (US); Soon Hyung Hong, Seoul (KR); Seong Woo Ryu, Seoul (KR)

(73) Assignees: BOARD OF REGENTS, THE UNIVERSITY OF TEXAS SYSTEM, Austin, TX (US); KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 395 days.

(21) Appl. No.: 13/814,448

(22) PCT Filed: Aug. 11, 2011

(86) PCT No.: PCT/US2011/047451
§ 371 (c)(1),
(2), (4) Date: Mar. 8, 2013

(87) PCT Pub. No.: WO2012/021724
PCT Pub. Date: Feb. 16, 2012

(65) Prior Publication Data
US 2013/0302605 A1   Nov. 14, 2013

Related U.S. Application Data

(60) Provisional application No. 61/372,820, filed on Aug. 11, 2010.

(51) Int. Cl.
*B05D 1/02* (2006.01)
*D01F 9/12* (2006.01)
(Continued)

(52) U.S. Cl.
CPC .............. *D01F 9/12* (2013.01); *B29D 99/0078* (2013.01); *D02G 3/04* (2013.01); *D02G 3/16* (2013.01);
(Continued)

(58) Field of Classification Search
CPC ........ B29C 41/22; B29C 41/32; C01B 31/022
See application file for complete search history.

(56) References Cited

U.S. PATENT DOCUMENTS 3,422,616 A * 1/1969 Felix ................................ 57/31
2001/0046564 A1* 11/2001 Kotov ........................ 427/430.1
(Continued)

FOREIGN PATENT DOCUMENTS

| EP | 2204493 A1 | 7/2010 |
| KR | 100718727 B1 | 5/2007 |
| WO | 2012021724 A2 | 2/2012 |

OTHER PUBLICATIONS

International Search Report and Written Opinion of PCT/US2011/047451 dated Mar. 28, 2012.

*Primary Examiner* — Galen Hauth
(74) *Attorney, Agent, or Firm* — Chainey P. Singleton; Chalker Flores, LLP

(57) ABSTRACT

The present invention provides a method of making a carbon nanotubes fiber by providing a polyethylene terephthalate substrate; contacting the polyethylene terephthalate substrate with a polyvinyl alcohol polymer solution to form a polyvinyl alcohol polymer layer on the polyethylene terephthalate substrate; contacting the polyvinyl alcohol polymer layer with a carbon nanotube solution, wherein the carbon nanotubes solution comprises one or more carbon nanotubes; forming a nanotube layer on the polyvinyl alcohol polymer layer; delaminating the polyvinyl alcohol polymer layer from the polyethylene terephthalate substrate to release a composite fiber layer; stretching the composite fiber layer; and drying the composite fiber layer.

26 Claims, 7 Drawing Sheets

(51) Int. Cl.
  *D02G 3/16* (2006.01)
  *D06M 11/74* (2006.01)
  *B29D 99/00* (2010.01)
  *D02G 3/04* (2006.01)
  *H01B 1/04* (2006.01)
  *B82Y 40/00* (2011.01)

(52) U.S. Cl.
  CPC ................. *D06M 11/74* (2013.01); *H01B 1/04* (2013.01); *B82Y 40/00* (2013.01); *D10B 2101/122* (2013.01); *Y10T 428/292* (2015.01); *Y10T 428/31938* (2015.04)

(56) References Cited

U.S. PATENT DOCUMENTS

| | | |
|---|---|---|
| 2004/0053780 A1 | 3/2004 | Jiang et al. |
| 2007/0041887 A1 | 2/2007 | Veedu et al. |
| 2009/0208708 A1 | 8/2009 | Wei et al. |
| 2009/0215344 A1 | 8/2009 | Lashmore et al. |
| 2010/0102280 A1* | 4/2010 | Ford et al. ............... 252/502 |
| 2010/0227155 A1* | 9/2010 | Bao et al. ................. 428/323 |
| 2011/0094777 A1* | 4/2011 | Swift et al. ............... 174/257 |

* cited by examiner

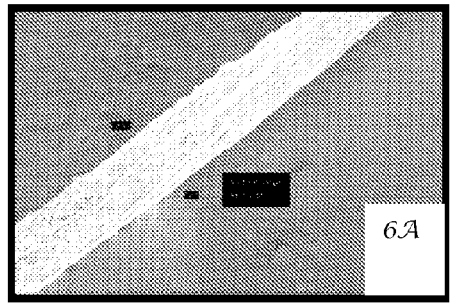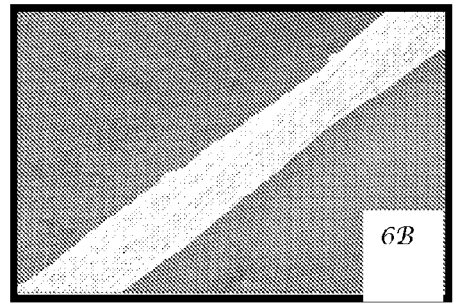
*FIGURES 6A-6B*
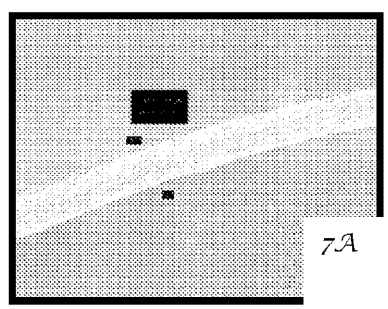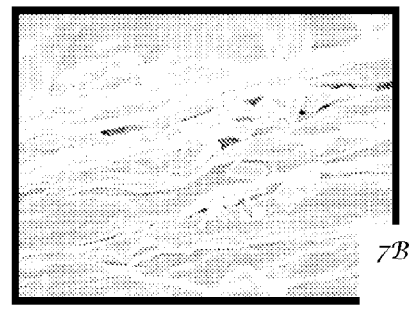
*FIGURES 7A-7B*
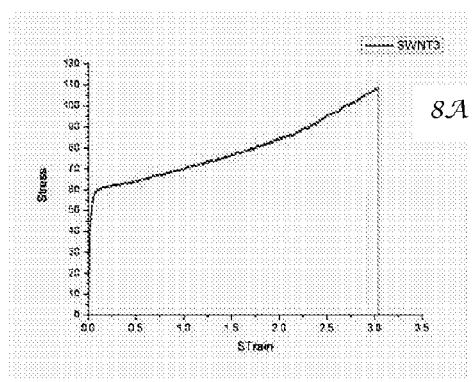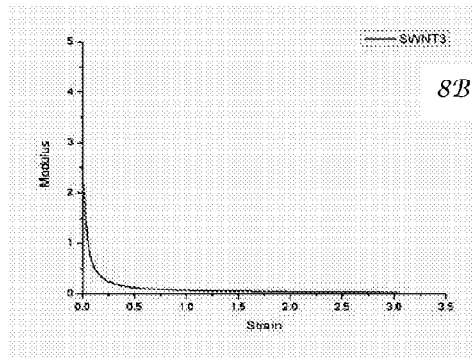
*FIGURES 8A-8B*

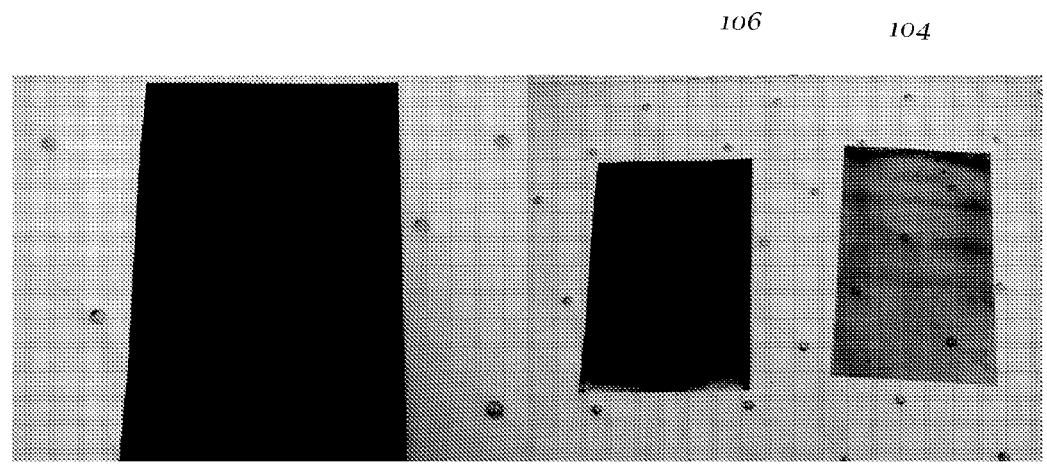
*FIGURES 9A*           *9B*
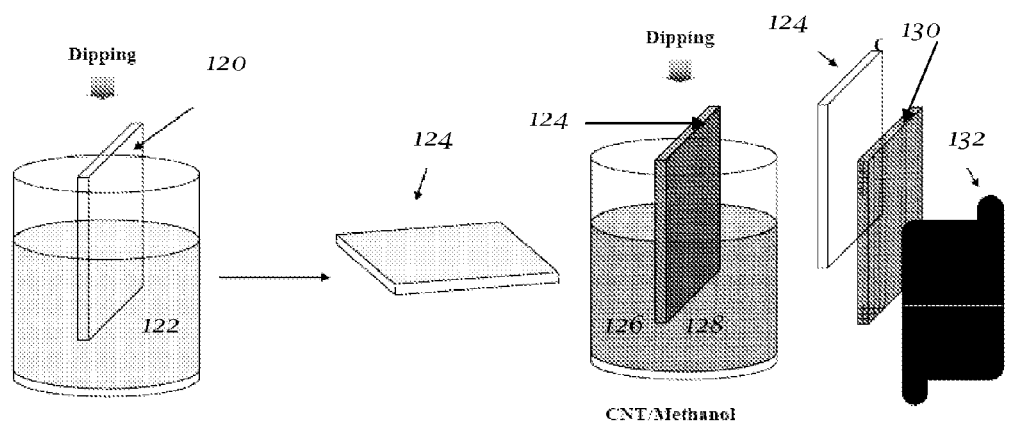
*FIGURE 10*

FABRICATION METHOD OF COMPOSITE CARBON NANOTUBE FIBERS/YARNS

CROSS-REFERENCE TO RELATED APPLICATIONS

This application is a National Stage of International Application No. PCT/US2011/047451, filed Aug. 11, 2011, which claims priority to and the benefit of U.S. Provisional Patent Application Ser. No. 61/372,820, filed Aug. 11, 2010. The contents of each of which are incorporated by reference in their entirety.

STATEMENT OF FEDERALLY FUNDED RESEARCH

None.

TECHNICAL FIELD OF THE INVENTION

The present invention relates in general to the field of making carbon nanotubes and more specifically, coating compositions and coating preparation, methods of coating comprised of single-walled nanotubes, double-walled nanotubes, or multi-walled nanotubes or mixture thereof onto substrates.

BACKGROUND ART

Without limiting the scope of the invention, its background is described in connection with making carbon nanotubes and more specifically, compositions and methods of making fibers from single-walled nanotubes, double-walled nanotubes, or multi-walled nanotubes.

Generally, carbon nanotubes (CNTs) are allotropes of carbon with a nanostructure that can have an extremely high length-to-diameter ratio. Carbon nanotubes are members of the fullerene structural family and their name is derived from their size, since the diameter of a nanotube is in the order of a few nanometers, while they can be up to several millimeters in length and may be categorized as single-walled nanotubes (SWNTs) and multi-walled nanotubes (MWNTs). Generally, carbon nanotubes are one of the strongest and stiffest materials, in terms of tensile strength and elastic modulus. This strength results from the covalent $sp^2$ bonds formed between the individual carbon atoms. These cylindrical carbon molecules have novel properties that make them potentially useful in many applications in nanotechnology, electronics, optics and other fields of materials science, as well as potential uses in architectural fields. They exhibit extraordinary strength and unique electrical properties, and are efficient conductors of heat.

DISCLOSURE OF THE INVENTION

The present application discloses a method of making a carbon nanotube fibers by providing a polyethylene terephthalate substrate; contacting the polyethylene terephthalate substrate with a polyvinyl alcohol polymer solution to form a polyvinyl alcohol polymer layer on the polyethylene terephthalate substrate; contacting the polyvinyl alcohol polymer layer with a carbon nanotube solution, wherein the carbon nanotubes solution comprises one or more carbon nanotubes; forming a nanotube layer on the polyvinyl alcohol polymer layer; delaminating the polyvinyl alcohol polymer layer from the polyethylene terephthalate substrate to release a composite fiber layer; stretching the composite fiber layer; and drying the composite fiber layer.

The method includes the step of twisting the composite fiber layer and or drawing the composite fiber layer into a composite fiber yarn. The polyvinyl alcohol polymer layer may be annealed or crosslinked. The polyvinyl alcohol polymer solution may be a 5% polyvinyl alcohol polymer solution with a molecular weight of between 50,000 and 90,000. The one or more carbon nanotubes may be in the form of single-walled nanotubes, double-walled nanotubes, multi-walled nanotubes or a mixture thereof and have a carbon nanotube content in fiber of between 18 and 70%. The substrate may alternatively be polyethylene terephthalate (PET), polyethylene naphthalate (PEN), polycarbonate or thermo-plastic olefin (TPO). The present application may also include the step of coating a second layer on the composite fiber layer, wherein the second layer comprises nanotube coats, nanofibers, polymer nanofibers, inorganic nanofibers, metal nanofibers or nano-materials, graphene nanoparticles, inorganic nanopaticles, metal nanopaticles, and multilayers nanotube coated polymer layer The present application discloses a method of making a carbon nanotube fiber comprising by providing a polyester substrate; contacting the polyester substrate with a polymer solution to form a polymer layer on the polyester substrate; contacting the polymer layer with a carbon nanotube solution; forming a nanotube layer on the polymer layer; delaminating the polymer layer from the polyester substrate to release a composite fiber layer; and stretching the composite fiber layer.

The present application also includes a method of making a composite fiber by contacting a polymer coated substrate with a carbon nanotube solution to form a nanotube composite fiber layer, wherein the polymer coated substrate comprises a polymer layer in contact with a substrate; delaminating the nanotube composite fiber layer from the substrate to release a composite fiber layer; and stretching the composite fiber layer.

The present application discloses a carbon nanotube composition having a nanotube layer in contact with a polyvinyl alcohol polymer layer, wherein the nanotube layer has a carbon nanotube content of between 18 and 70% and mechanical properties comprising a tensile strength between 3.2 and 4.0 GPa and a Young's modulus of between 54 and 84 GPa. The Young's modulus may be about 84 GPa and the tensile strength may be about 3.8. The carbon nanotube composition may be drawn carbon nanotube yarn.

DESCRIPTION OF THE DRAWINGS

For a more complete understanding of the features and advantages of the present invention, reference is now made to the detailed description of the invention along with the accompanying figures and in which:

FIG. 4A is an image after 2 minutes, FIG. 4B is an image after 3 minutes and FIG. 4C is an image after 5 minutes.

FIGS. 6A and 6B are SEMs of SWNT fiber with a 60-70 μm diameter.

FIGS. 7A and 7B are SEMs of MWNT fiber with a 50 μm Diameter.

FIGS. 8A and 8B are graphs of the tensile strength and Young's modulus of SWNT fiber prepared from SWNT coated on film.

FIGS. 9A and 9B are images of the CNT coated (PET) film.

FIG. 10 is an illustration of a method of preparing the CNT coated (PET) film.

DESCRIPTION OF THE INVENTION

Figure 1:
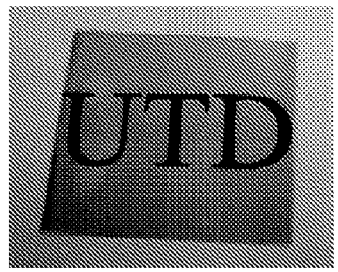
FIG. 1 is an image of a photograph of transparent and conductive purified HiPco SWNT on flexible PEN substrate.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

As used herein the term "fiber" encompasses fibers of various diameters and compositions including twisted and pulled fibers including yarns.

As used herein the term "tensile strength" is important for a material that is going to be stretched or under tension. Fibers need good tensile strength.

As used herein the term "toughness" is a measure of the energy a sample can absorb before it breaks As used herein the term "Young's modulus (E)" is a measure of the stiffness of a given material. The Young's modulus, E, can be calculated by dividing the tensile stress by the tensile strain:

$$E \equiv \frac{\text{tensile stress}}{\text{tensile strain}} = \frac{\sigma}{\varepsilon} = \frac{F/A_0}{\Delta L/L_0} = \frac{FL_0}{A_0 \Delta L}$$

where E is the Young's modulus (modulus of elasticity) measured in pascals; F is the force applied to the object; $A_0$ is the original cross-sectional area through which the force is applied; $\Delta L$ is the amount by which the length of the object changes; $L_0$ is the original length of the object.

The present application discloses a novel, versatile and robust coating process from single-walled nanotubes (SWNTs), double-walled nanotubes (DWNTs), or multi-walled nanotubes (MWNTs), or mixture thereof on a substrate. For example, the present application discloses flexible transparent conductor with between 0.1 and 100 K Ohms/sq and any specific individual value between, e.g., between 0.4 and 1000 Ohms/sq, 100-1000 Ohms/sq, 0.26 Ohms/sq and so on. In addition, the percentage transmittance range may be between 0-99% and any specific individual value between, e.g., 1-85%, 10-90%, 50%, 0.1-5%, and so on. The wavelength will be between 400-700 nm. In addition, the skilled artisan will recognize that the thickness of the substrate may affect these properties and tailor the parameters to produce a desired transparency, and conduction.

Provided is a method of making a CNT coating composition and CNT coated plastic substrate having less than 200 Ohm/sq with about 90% transmittance at about 400-700 nm wavelength range to be used as a component for electronic devices. For example, the present application discloses 110 Ω/sq at 88% transmittance using purified single walled nanotubes (SWNTs) coated on a polyethylene naphthalate (PEN) substrate. The present application also simplifies the overall coating procedure; to reduce the number of steps necessary from five steps (as seen in the prior art) to three steps utilizing an sonication method and a proper selection of organic solvent, e.g., methanol, ethanol, acetic acid, acetone, acetonitrile, benzene, 1-butanol, 2-butanol, 2-butanone, t-butyl alcohol, carbon tetrachloride, chlorobenzene, chloroform, cyclohexane, 1,2-dichloroethane, diethyl ether, diethylene glycol, diglyme (diethylene glycol, dimethyl ether), 1,2-dimethoxy-ethane (glyme, DME), dimethylether, dimethylformamide (DMF), dimethyl sulfoxide (DMSO), dioxane, ethanol, ethyl acetate, ethylene glycol, glycerin, heptane, Hexamethylphosphoramide, (HMPA), Hexamethylphosphorous, triamide (HMPT), hexane, methanol, methyl t-butyl, ether (MTBE), methylene chloride, N-methyl-2-pyrrolidinone, (NMP), nitromethane, pentane, Petroleum ether (ligroine), 1-propanol, 2-propanol, pyridine, tetrahydrofuran (THF), toluene, triethyl amine, water, water, o-xylene, m-xylene, and p-xylene.

In addition, the use of metallic SWNTs can significantly improve the conductivity and transmittance compared with the use of mixed SWNTs, i.e., unseparated SWNTs.

The present application discloses an adhesion mechanism between SWNTs and the surface of a polyethylene naphthalate (PEN) substrate. The π-π stacking effect and hydrophobic interaction are the major contributing factors for CNTs to adhere on the surface of the substrate.

Numerous flexible electronic devices require electrically conductive flexible films, which are optically transparent to visible light (e.g., 400-700 nm wavelength range). Films have been prepared using several coating materials and methods, including semiconducting oxides of: tin indium, zinc, cadmium, or metals such as silver. Transparent and electrically conductive coatings on flexible films will be useful for electronic device fabrications particularly for flat panel displays, touch screen panels, solar cells, and polymer light emitting diodes (LEDs).

Current transparent conductive coatings mainly utilize Indium Tin oxide (ITO) material, which is deposited by chemical vapor deposition (CVD), sputtering or other methods on a substrate, followed by an annealing. ITO films on flexible substrates are inferior in terms of flexibility. Hence, there is a need to find a novel alternative for ITO. Carbon nanotubes (CNTs) are the material of ever-increasing interest due to their excellent electronic, physical and chemical properties. The high electrical conductivity of SWNTs is associated only with metallic SWNTs, but all of the available synthesis methods for SWNTs yield mixtures of metallic and semiconducting nanotubes. Moreover, metallic SWNTs generally represent the minority fraction in the mixture except the one synthesized from a laser ablation method.

Certain polymeric substrates are much lighter and more flexible than glass substrates while being transparent, and are therefore, preferred for use over glass substrate for light weight and flexible electronic devices. Recently, polyethylene terephthalate (PET) and polyethylene naphthalate (PEN) substrates have been reported as potential substrates for the fabrication of polymeric transistors. The two types of polymer films have relatively high optical transmittance at 400-700 nm wavelengths which render them suitable as substrate for optical display and plastic electronic applications. In previous published work, CNTs were dispersed in an aqueous solution using a surfactant (TritonX-100 or SDS) to make a stable solution; however, the surfactant adsorbed on the surface of CNTs will decrease the conductivity since the surfactant will act as an insulator: the surfactant is likely to obstruct the contact among nanotubes and hence prevent them from contacting one another. Therefore, removing the surfactant makes the transparent conductive coatings more conductive.

Geng et al. made a flexible transparent conductive film on PET substrate using SDS dispersed SWNTs. When the film was further immersed in various acids, they observed an improvement in the conductivity with a negligible change in transparency. They attributed this enhancement to the removal of surfactant, resulting in a dense film which improved the cross-junction between SWNT networks. The densification of SWNT film improved the conductivity by 25%. To date, however, no convincing results have been reported meeting the performance needed for flexible electronic devices. Sheet resistance in the range of 1,000-30 Ω/sq with a wide range of transmittance 90-50% have been reported. Part of the variability in results is due not only to the varying sample characteristics of the SWNTs but also the different synthesis methods and purification methods. In addition, there is a trade-off between conductivity and transmittance. When the conductivity goes up, the transmittance goes down, and every research group studies a different system and reports results in different emphasis. Therefore, it is very difficult to refer to published results and draw a firm conclusion.

The present application discloses single walled carbon nanotubes synthesized by different methods and tested to investigate the best candidate SWNT without using surfactant with the flexible substrates. The flexible substrate is coated with a polymer layer. The nanotubes were dispersed in methanol without using surfactant with sonication. A flexible substrate was then dipped into the solution while sonicating to coat SWNTs on film. Several factors, such as purity, type of carbon nanotube, metallic and semiconducting SWNT and different substrates, were evaluated to find the best performance.

The present application discloses metallic, purified HiPco SWNTs on a PEN substrate with no surfactant use to achieve the best performance in considering both electrical conductivity and transmittance in the 400-700 nm wavelength range.

A 25 mg sample of SWNTs in 15 mL methanol was prepared without using any surfactant. The mixture was then sonicated with a probe sonicator. This SWNT dispersed solution was then added to a beaker with a 100 mL of methanol. The solution was kept under continuous bath sonication while dipping a piece of PET (thickness: 175 μm) or PEN (125 μm) into the solution. The dipping can be repeated or extended for different times to obtain thicker SWNT coating on a film. The coated film was then dried at an ambient temperature for 5 minutes.

The present application discloses a composition with high transmittance and high electrical conductivity while using various SWNTs: Purified SWNTs (HiPco), purified SWNTs synthesized from laser ablation, and as-synthesized SWNT from arc discharge and two additional SWNTs samples. Preparations of coated samples were done by coating the substrate on both sides with a dip coating method using PET substrate. The comparison of 4-probe sheet resistance and transmittance for samples prepared using various CNTs with up to three coatings are shown in Table 1 below.

TABLE 1

| Sample | One coating | | Double coatings | | Triple coatings | |
| --- | --- | --- | --- | --- | --- | --- |
| | T % | Rs(Ω/sq) | T % | Rs(Ω/sq) | T % | Rs(Ω/sq) |
| Purified HiPco[1] | 72 | 1.9K | 70 | 0.95K | 65 | 493 |
| Purified laser[2] | 75 | 1.3K | 72 | 974 | 69 | 185 |
| Z- SWNT[3] | 81 | — | 79 | 45K | 72 | 27K |
| ASA-100F[4] | 79 | 380K | 72 | 158K | 69 | 100K |
| Arc-discharge[5] | 78 | 167K | 72 | 61K | 70 | 56K |

Substrate used: PET (control);
T % = 85 CNI,
[2]Rice University,
[3]Zyvex,
[4]Iljin, Korea and
[5]Clemson University.

The SWNTs made by laser ablation gave the lowest sheet resistivity, i.e., the highest conductivity: 185 Ω/sq. This performance is probably due to the fact that it has the highest content of metallic CNT (70%) among the different SWNTs. However, the laser CNT is not commercially available. Therefore, we choose to use the commercially available purified HiPco SWNT in our work. For example, one embodiment of the instant invention provided both side coatings with 110 Ω/sq at 88% transmittance using purified single walled nanotubes (SWNTs) coated on a polyethylene naphthalate (PEN) substrate. See Table 2 below.

TABLE 2

| Samples | time | First coatings | | Second coatings | | Third coatings | |
| --- | --- | --- | --- | --- | --- | --- | --- |
| | | T % at 550 nm | Rs (KΩ) | T % at 550 nm | Rs (KΩ) | T % at 550 nm | Rs (KΩ) |
| Sample 1 | 1 min. | 96 | 30-60 | 94 | 10-20 | 93 | 1-5 |
| Sample 2 | 2 min. | 94 | 20-40 | 93 | 10-0.4 | 91 | 0.4-0.2 |
| Sample 3 | 3 min. | 93 | 10-20 | 91 | 1-0.3 | 88 | 0.3-0.1 |

Substrate used: PEN (control);
T % = 95.

As the number of coatings on the PET or PEN substrate increase, the conductivity increases but the transmittance decreases. Thus, there is a trade-off between conductivity and transmittance.

FIG. 1 is a photo image of a transparent and conductive purified HiPco SWNT on a flexible PEN substrate. A sheet of paper with printed "UTD" was placed underneath the coated film to illustrate the transparency of the coating. PEN substrate was dipped in the solution while the solution was being bath-sonicated to coat CNTs onto the film. The longer dipping time gave the thicker coating of CNTs (Table 2). This simple coating method was achieved by the proper use of both probe and bath sonication with a good selection of solvent such as methanol. Unlike prior art approaches which require the use of a surfactant, here we use only a low boiling point solvent such as methanol to coat SWNTs on a flexible substrate.

As mentioned before, the high electrical conductivity should be associated only with metallic SWNTs, and all of the available production methods for SWNTs yield a mixture of metallic and semiconducting carbon nanotubes. Moreover, metallic SWNTs generally represent the minority fraction in the mixtures (statistically 1:2 for metallic/semiconducting) except SWNT synthesized by the laser ablation method (2:1, respectively). Wang et al. demonstrated that semiconducting SWNTs could be extracted from the purified SWNT sample through their preferential interactions with 1-docosyloxymethyl pyrene (DomP) as the planar aromatic agent yields substantially enriched metallic SWNTs. They also reported that when the separated metallic fraction was dispersed in thin conductive polymer film and the metallic SWNTs enhanced electrical conductivity of the resulting nanocomposites significantly, compared with the film made using non-separated purified nanotube sample. The electrical conductivity for the unseparated sample was 2.3.10-2 S/cm and that for the separated sample 10-2 S/cm.

The present application also uses a metallic enriched sample known in the art (e.g., Prof. Sun of Clemson University) for sample preparations. The unseparated SWNT was produced from an arc-discharge method, and both separated metallic and semiconducting nanotube samples were coated on a PET substrate and compared their performances. The comparison in Table 3 below, clearly shows that the film coated with the metallic SWNT is more conductive than the semiconducting as well as the mixture of SWNTs at the same transmittance level.

TABLE 3

| Sample | One coating | | Double coatings | | Triple coatings | |
| --- | --- | --- | --- | --- | --- | --- |
| | T % | Rs(Ω/sq) | T % | Rs(Ω/sq) | T % | Rs(Ω/sq) |
| Mixture | 78 | $167 \times 10^3$ | 72 | $61 \times 10^3$ | 69 | $14 \times 10^3$ |
| Semi-conducting | 82 | $175 \times 10^3$ | 79 | $95 \times 10^3$ | 75 | 1,493 |
| Metallic | 85 | 403 | 82 | 262 | 80 | 130 ± 5 |

Substrate used: PET (control);
T % = 85

Moreover, the increase in conductivity is about 7 fold between the use of metallic and that of semiconducting one by looking at the conductivity values at 82% transmittance (Table 3 above).

The conductivity of the metallic CNT gives the lowest sheet resistivity (130 Ω/sq) with 80% transmittance with PET (control has 85% transmittance) with both side coatings. The results show that it is a significant challenge to take full advantage of the separated metallic SWNTs for making excellent transparent conductive film with the highest conductivity.

ITO is the preferred choice for conductive coating material on glass substrate. However, ITO has some limitations with flexible substrates: the film coated with ITO is brittle due to inorganic material; therefore, it is a great concern for flexible display applications. It is known that CNTs can resist mechanical test such as bending or crumpling with little loss of conductivity. The abuse test with SWNT coated PET showed a slight increase sheet resistivity even after severe bending and crumpling even up to 90° bending.

Figure 2:
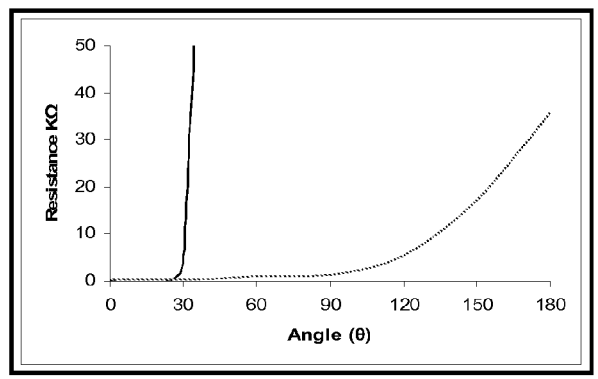
FIG. 2 is a plot of the flexibility of a SWNT/PET sample and an ITO/PET sample with two probe resistance.

FIG. 2 is a graph of the flexibility study of SWNT/PET vs. ITO/PET with two probes resistance. The ITO coated on PET becomes essentially no conductivity upon a 30° bending: As seen in FIG. 2. We believe the flexibility provided by the use of SWNTs lead to open opportunities for the construction of flexible electronic circuits and devices. The present application uses PEN and PET substrates, PEN provides better optical transmittance and conductivity with CNT coating than PET does which will be most likely due to the thickness difference. One embodiment of the instant invention provided better CNTs adhesion with PEN. The properties of PEN film are similar to PET but PEN film offers improved performance over PET in the areas of dimensional stability, stiffness, UV weathering resistance, low oligomer content, tensile strength, hydrolysis resistance and chemical resistance.

In addition, the present application discloses a difference of surface energy between PEN and PET by a contact angle measurement. The contact angles for PEN and PET film were measured using a manual goniometer ACEI (Rame-Hart, Inc, model #50-00-115). With DI water, three droplets at different regions of the same piece of film were used for the measurement, and at least two pieces of film were used in order to obtain reliable contact angle measurement. The PEN film is more hydrophobic with a contact angle of 85 degrees compared with the PET film having the angle of 69 degrees, and the standard deviation of this measurement was less than 3 degree. The higher hydrophobicity with PEN film is due to the difference in chemical composition between the two substrates.

Figures 3A, 3B:
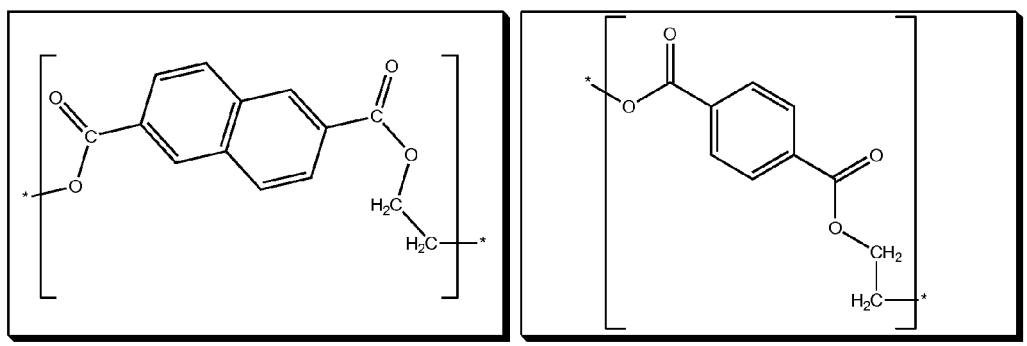
FIGS. 3A and 3B are chemical structure schematics of PEN and PET, respectively.

FIG. 3 is an image of the structures of PEN (left) and PET (right). PEN has more aromatic rings than PET in a unit surface area. In order to further understand the differences shown by the two substrates, AFM surface image study of the substrates coated with SWNT was conducted.

The comparative surface roughness showed that PEN (4.4 nm) gives less than PET (9.4 nm). This trend does not correlate with the crystallinity of the polymers, i.e., PET and PEN are semi-crystalline with PEN having a higher degree of crystallinity compared to PET due to its more rigid backbone structure. A higher degree of crystallinity often results in a rougher surface. The higher surface roughness of the polymer substrate does not favor the adhesion of SWNT but it does in this case.

Aromatic compounds are known to interact with graphite, and consequently with the graphitic sidewalls of CNTs. This kind of physisorption and noncovalent functionalization of CNT with organic molecules does not significantly perturb the atomic structure of the CNT. In order for a molecule to interact with the nanotube surface, it should contain π bonds to form π stacks and/or it should be able to form a molecular complex also called a π-complex with the electron rich nanotube surface. Thus, it is understood that aromatic rings in substrate adheres to the surface of CNT better. In addition, it is believed that the adhesion is strengthened by a hydrophobic interaction as well. To verify this hypothesis, a commercially available microscope glass slide was rinsed with deionized water and then dipped into a mixture of 50 ml concentrated sulfuric acid and 25 ml 30% hydrogen peroxide ('piranha solution') overnight. This generates hydroxyl groups on the surface of the glass and the hydrophilic glass surface yielded no adhering CNT.

The fresh hydrophilic surface was thoroughly rinsed with deionized water, and dried. Hydrophobic glass surface was then obtained by immersing the substrate in a 0.1 wt % solution of 1,8-bistriethoxysilyloctane in hexane for 1 hour and dried.

The hydrophobic glass surface generated from the immersion yielded a good adhesion to the film of CNTs. The results indicated that hydrophobic interactions between CNTs and non aromatic hydrophobic surfaces were weak. The SWNTs were adhered to the surface of the aromatic ring containing substrate as a result of good compatibility of the hydrophobic SWNTs with the hydrophobic polymer surface of the film. The surface of the PET film was modified to become hydrophilic by a process known as hydrophilization. Surface modification to increase the hydrophilicity of PET surface can be done by either introducing oxygen-containing radical groups or coating hydrophilic polymer chains to the surface of PET. The hydrophilic surface generated on the surface of PET should reduce adhesion between the PET surface and hydrophobic SWNTs. Hydrophilization can be conducted by using one of the several known methods: UV-ozone treatment, chemical oxidation, organic chemical functionalization and radiation induced surface grafting. The UV-ozone treatment method uses UV Light and Ozone to both clean and modify the molecular level surface of the solid substrate. The chemical oxidation method involves the use of oxidants such as chromic acid, nitric acid, and potassium permanganate to oxidize polymer surface, introducing oxygen-containing groups onto the polymer surface. Ton-That el al. have studied the effects of ultraviolet-ozone (UVO) oxidation of polyethylene terephthalate (PET) surface. They reported that surface oxygen increases from 26% (untreated) to 37% for the most oxidized surfaces produced. Ultraviolet-ozone (UVO) treatment of PET films was carried out in a SAMCO UV-ozone dry stripper Model UV 1. The reactor contains a quartz high intensity low pressure mercury vapor grid lamp which emits UV light at 185 and 254 nm wavelengths, which are known to excite oxygen to form ozone and atomic oxygen, and also to photosensitize polymer surfaces (50-52).

Figures 4A, 4B, 4C:
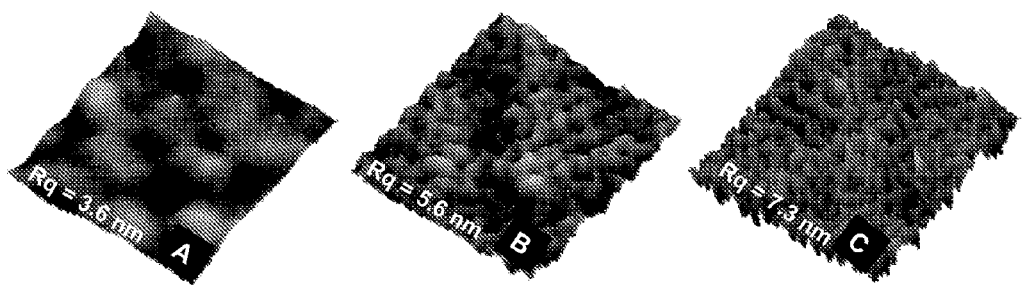
FIGS. 4A-4C are AFM images of PET treated with UV-ozone where
Figures 5A, 5B, 5C, 5D:
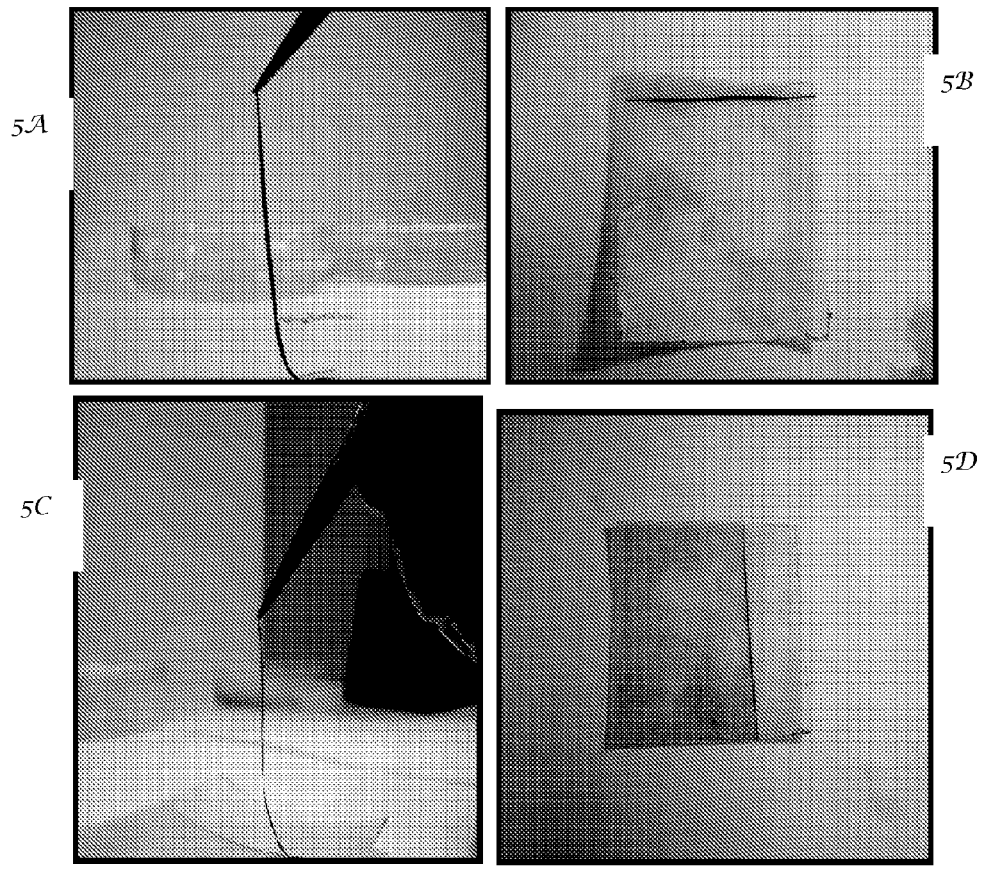
FIGS. 5A-5D are images of CNT coated plastic film and manual preparation of fiber.

FIGS. 4A-4C are AFM images of PET treated with UV-ozone after various times: FIG. 4A is an image after 2 minutes, FIG. 4B is an image after 3 minutes and FIG. 4C is an image after 5 minutes. PET films were typically treated at a constant distance of approximately 10 cm from the lamp for a range of exposure times (1 to 5 minutes) under atmospheric conditions. The effect of UV-Ozone treatment time vs. PET morphology as measured by AFM. There is an increase in mean surface roughness Ra from 3.6 nm on the 2 minutes to 7.3 nm on the 5 minutes treated surface. The contact angle of DI water at the treated PET surface decreases from approximately 76° with increasing irradiation time until it reaches a saturation value at about 30°, which proves an increase of the hydrophilic behavior of the surface with longer irradiation time.

UV-ozone treated PET film samples having different treatment time were coated with purified HiPco SWNT for a total of 4 minutes (2 minutes+dry+2 minutes) and the sheet resistance (4 probe measurement) as well as transmittance of each sample were measured (as seen in Table 4 below).

TABLE 4

| Sample | Exposure Time (min) | Sheet resistance (KΩ/sq) | Transmittance % |
|---|---|---|---|
| 1 | 0 | 0.25 | 83 |
| 2 | 1 | 530 | 87 |
| 3 | 2 | 1,390 | 88 |
| 4 | 3 | 1,250 | 88 |

TABLE 4-continued

| Sample | Exposure Time (min) | Sheet resistance (KΩ/sq) | Transmittance % |
|---|---|---|---|
| 5 | 4 | — | 89 |
| 6 | 5 | 1,440 | 89 |

The results clearly show that as the treatment of the substrate time increases, sheet resistance as well as transmittance increases. This means that as the treatment time increases, hydrophilicity of PET surface increases so it attracts less hydrophobic CNTs to deposit on PET film. The results support our hypothesis of the adhesion of SWNTs on PET (or PEN) surface due to hydrophobic-to-hydrophobic interaction.

Thus, a possible mechanism is the good compatibility of the hydrophobic SWNT to the hydrophobic polymer surface of the PET (or PEN). In order for an aromatic compound to interact with the nanotube surface, it should include π bonds to form π stacks and/or to form a molecular complex also called a π-complex with the electron rich nanotube surface. PEN with more aromatic ring in unit surface area vs. PET will give more π stacking with CNTs than PET will. Therefore combining π-π stacking or π-complex plus hydrophobic-hydrophobic interaction are the main contribution factors that provide a good adhesion between SWNTs and PEN with little or no effect from the surface roughness.

The present application discloses a coating procedure that reduces the number of steps from five steps to three steps by eliminating the use of a surfactant with a good solvent selection using sonication. For example, many prior art methods use five steps due to the use of a surfactant for CNT dispersion where the need of its removal after coating is necessary since surfactant acts as an insulator. The present application uses transparent conductive thin films made with various SWNTs and substrates. Transparency and conductivity of different carbon nanotubes after coating on a substrate using dip coating were also evaluated. One embodiment, provides 110 Ω/sq at 88% transmittance using a purified SWNT (HiPco) sample with PEN film, and 130 Ω/sq at 80% transmittance using metallic enriched SWNT (arc discharge) with PET film. The performance data was measured with both sides coated in the samples, so that once only one side is coated; then its transmittance will be higher than we reported.

In addition, the PEN substrate gave better performance considering both optical transmittance and conductivity than the PET substrate. The better performance with PEN is due to the fact that PEN has higher transmittance and is more hydrophobic than PET and has more π-π stacking effect between SWNTs and its surface in addition to its higher surface smoothness with thinner thickness (125 μm vs. 175 μm).

Therefore, based on our study about a possible adhesion mechanism between SWNTs and the substrate, we concluded that π-π stacking effect and hydrophobic-to-hydrophobic interactions are the main factors to have CNTs adhere on the surface of the substrate.

Lastly, the carbon nanotube coated films exhibit good mechanical flexibility that exceeds ITO coated films when films were bent or folded. The flexibility makes CNT coated films an attractive alternative for constructing flexible electronic devices such as solar cell, OLED and touch panel.

The CNT is a material with a cylindrical shape obtained by rolling up a layer of graphite in which six-membered rings of carbon are linked. A diameter of the CNT is about 1 nm to several tens of nm. In addition, the CNT is classified into a single-walled CNT (SWCNT) including only a single layer, double-walled nanotubes (DWNTs) and a multi-walled CNT (MWCNT) in which multiple layers are formed in a concentric cylindrical shape. As used herein, double-walled nanotubes (DWNTs) and multi-walled nanotubes (MWNT) consist of multiple layers of graphite rolled in on themselves to form a tube shape. Double-walled nanotubes (DWNTs) and multi-walled nanotubes (MWNT) provide similar morphology and properties as compared to SWNT, while significantly improving their resistance to chemicals.

SWNTs have a unique property of electrical conductivity and current-carrying capability similar to copper, thermal conductivity higher than diamond, and mechanical strength higher than any naturally occurring or man-made material. Baughman et al. estimates theoretical elastic modulus of 640 GPa and a tensile strength of 37 GPa.

Coating CNT on a substrate. A 25 mg sample of SWNTs (alternatively SWNTs, DWNTs, MWNTs and/or mixtures thereof may be used) was mixed in 25 ml of methanol (or other organic solvent) without using any surfactant. The mixture was then sonicated to disperse the carbon nanotubes with a probe sonicator for 25 minutes at power output of about 45%. This SWNTs dispersed solution was then added to a beaker with 100 ml of methanol. The solution was kept under continuous bath sonication while dipping a piece of a plastic film. This process can be repeated for several times to obtain thicker films. The coated film was dried under ambient conditions. This process can also be performed using a polymer coated film.

The present application discloses a novel and versatile process for the preparation of carbon nanotubes fibers from various carbon nanotubes layer coated on substrates, e.g., plastic film. This process can be used for the production of various fibers not only from single-walled nanotubes (SWNTs), double-walled nanotubes (DWNTs), or multi-walled nanotubes (MWNTs) but also from the mixtures thereof. This process can also use both synthesized and purified CNTs. Thus, this robust process of the present application discloses a great potential as a new versatile fabrication method of different CNT fibers and mixtures thereof.

The present application discloses a method of making a CNT composition and CNT devices having less than 100 Ohm per sq with about 90% transmittance at about 400-700 nm wavelength range to be used as a component for electronic devices.

The performance characteristics of the fibers dependent on the type of carbon nanotubes used and the process conditions. The present application discloses fibers having high mechanical (and electrical) property but also to find a process and formulation with which can be capable to tailor the property of each fiber to be made. With no optimization work, SWNT fibers manually prepared gave as high as 109 MPa of tensile strength and 2.2 GPa of modulus and MWNT fibers gave as high as 89.6 MPa and 6.3 GPa, respectively.

The present application discloses continuous fibers with at least 80-90% of current state-of-the-art fiber's mechanical performance. Additionally, the present application includes methods of making prepregs and fabrics with the fibers, which can be used for the preparations of nano composites with ceramic, metal and engineering polymer matrix.

The present application discloses 2, 3, 4, 5, 6, 7, 8, 9, 10 or more layers that may be the same or different in composition, e.g., a nanotube fiber, polyaniline nanofibers, TiO2 nanotubes, V2O5 nanorods, gold nanowires, gold, Ag, Pt, PdTiO2. In addition, the layers may be doped with nanoparticles, nanotubes, nanofibers, polymers, nanofibers, inorganic nanofibers, metal nanofibers, nano-materials, graphene nanopaticles, inorganic nanopaticles, metal nanopaticles, and multilayers nanotube coated polymer layers. The polymer can be a thermoset or thermoplastic polymer. The polymer can be cured during annealing having well balanced rigid and soft segment. The polymer can be polyamide, imide-amid, PVA, etc.

SWNTs have a unique property of electrical conductivity and current-carrying capability similar to copper, thermal conductivity higher than diamond, and mechanical strength higher than any naturally occurring or man-made material. Baughman et al. estimate a theoretical elastic modulus of 640 GPa and a tensile strength of 37 GPa.

Technologies for processing CNTs into macroscopic materials are still at a much earlier stage. Macroscopic carbon nanotube fibers have the potential to form high-strength, lightweight, thermally and electrically conducting structural material at lower cost. Some applications such as the space elevator will require ultra-strong SWNT fibers; other applications will require supplementary multifunctional properties and not such high mechanical strength. The electrical properties may be use for highly efficient transmission of electricity over long distance. Thermal properties can be exploited in microelectronic applications where thermal management is an increasing problem as miniaturization progress.

Early studies of CNT-reinforced nano-composites showed that CNTs were effective fillers to enhance the mechanical properties of polymer matrixes but the reinforcement was limited by the quality of dispersion, CNT alignment, and load-transfer efficiency between the CNT and the matrix. Thus, it has been a challenge to make macroscale CNT structures and to fully utilize the outstanding mechanical and other physical properties of CNTs.

There are three main types of commercial fiber spinning: melt spinning, dry spinning, and wet solution spinning. However, melt spinning CNTs is difficult since CNTs decompose before melting. Most SWNTs fibers have been produced by the solution spinning process. The starting CNTs must be dispersed into a solvent, and the solvent must be extracted after the extrusion to form the solid fiber. Solution spinning can be considered as four step process: dispersion or dissolution of the fiber material into a solvent, mixing and spinning the dispersion, coagulation and drawing into a solid fiber, and post processing of the fiber through washing, drying, or annealing steps. Fibers of carbon nanotubes micrometers to millimeters long have been produced by variations of chemical vapor deposition (CVD).

The first macro-scale CNT structure was in the form of a film called bucky-paper, which displayed relatively high electrical and thermal conductivity, but low mechanical properties. For the purpose of obtaining superior mechanical performance, researchers have recently focused on CNT fibers. Gommans et al. have spun fibers electrophoretically from purified laser vaporization grown SWNTs dispersed in N,N-dimethylformamide (DMF) at concentration of about 0.01 mg/ml. CNTs fiber was successfully prepared through spinning a CNT homogeneous dispersion into a polyvinyl alcohol (PVA) coagulation bath. This approach was modified by Baughman's group to make SWCNT composite fibers with very high strength. The major issues with this approach include a relatively high fraction of remaining polymer volume and random alignment of CNTs, which limits the fiber's strength, electrical and thermal conductivity.

Recently, new approaches have been reported in which pure CNT fibers were spun without a matrix. For example, pure CNT fibers were spun from a CNT-fuming sulfuric acid solution. A continuous MWCNT yarn was pulled from a high-quality array without twisting. SWCNT fibers were spun from an aero-gel in the chemical vapor deposition synthesis zone and MWCNT fibers were spun from CNT arrays with twisting and other techniques. These CNT fibers usually have strength of ≤1.5 GPa and Young's modulus of ≤30 GPa. Miaudet et al. prepared CNT/PVA fibers and then stretched them at higher temperature than glass transition temperatures of PVA. The drawn fibers possess 1.8 GPa of tensile strength, and 45 GPa of modulus. Dalton et al. modified coagulation-based method. They spun mechanically strong SWNT/PVA gel fiber using co-flowing PVA coagulant pipe. These fibers reach 1.8 GPa of strength and 80 GPa of modulus. Our new methods (process II and III) however, can give the fibers to the highest tensile strength and modulus. For example, see Table 5 below.

TABLE 5

The sample was prepared by process III, then was annealed at 120 C. for 5 min.

|  | Before annealing | After annealing | Differences |
|---|---|---|---|
| Tensile Stress (GPa) | 1.8 | 3.8 | 111% |
| Young's Modulus (GPa) | 68 | 84 | 23.5% |

These fibers, however, show too low electrical conductivity (0.1~10 S/cm). Because PVA is a non-conductive polymer, CNT fibers containing PVA should show low thermal and electrical conductivity. Muñoz et al. replaced the PVA coagulant with a polyethlyeneimine (PEI) coagulant. As a result, these fibers can possess 100~200 S/cm of electrical conductivity, although they have ordinary mechanical properties. Ericson et al. reported that SWNT fiber could be spun using super acid. SWNTs in 102% of sulfuric acid were mixed in the tube and formed themselves into rod-like structure under certain pressure. Mixture was spun into coagulation bath (diethyl ether, 5 wt % aqueous sulfuric acid, or water) and then washed several times. These SWNT fibers possess good mechanical properties, with 120 GPa of modulus, 116 MPa of tensile strength, 21 W/km of thermal conductivity and 5.0× $10^3$ S/cm of electrical conductivity. Another process to spin SWNT fibers without polymer was introduced by Kozlov et al. This process utilized flocculation principle that dispersed SWNT bundles with anionic surfactant (lithium dodecyl sulfate (LDS)) in the water were aggregated in the strong acid. In contrast to Vigolo's works, the flocculation-based process used 37% HCl bath as a flocculation agent. SWNT fibers spun with this method have 65 MPag-1 cm-3 of a density-normalized specific stress, 12 GPag-1 cm-3 of modulus and 140 S/cm of electrical conductivity after annealing at 1000° C. in flowing argon. All of the literatures published so far shows that each process can produce either SWNT fibers or MWNT fibers. In general SWNT fibers were prepared with/without polymer (dispersant) binder from solution process, and MWNT fibers from similar process or dry harvesting from MWNTs forest or solution with dispersant with/without polymer binder use.

The present application discloses a method, with no dispersant/binder, that can produce various fibers not only from single-walled nanotubes (SWNTs), double-walled nanotubes (DWNTs), or multi-walled nanotubes (MWNTs) but also from the mixtures thereof with both as-synthesized and purified forms of CNTs. Thus, the fibers prepared from the present application provide new composition based fibers having outstanding mechanical and other intrinsic physical properties of CNTs, especially, electrical properties since the process does not use either dispersant or polymer binder.

Coating CNT on plastic substrate. A 25 mg sample of SWNTs (alternatively SWNTs, DWNTs, MWNTs and/or mixtures thereof may be used) was mixed in 25 ml of methanol (or other organic solvent) without using any surfactant. The mixture was then sonicated to disperse the carbon nanotubes with a probe sonicator for 25 minutes at power output of about 45%. This SWNTs dispersed solution was then added to a beaker with 100 ml of methanol. The solution was kept under continuous bath sonication while dipping a piece of a plastic film. This process can be repeated for several times to obtain thicker films. The coated film was dried under ambient conditions. This process may also be performed using a polymer coated film.

FIGS. 5A-5D are images of CNT coated plastic film and manual preparation of SWNTs coated on plastic film, and the SWNTs layer on the film after acid treatment was then used for fiber drawing with/without manual twisting. Fiber was steadily pulled from the CNTs layer with a pair of sharp tweezers. The most preferred physical state of CNTs layer on the film for fiber drawing is most likely dependent on the carbon nanotubes qualities such as CNT, its purity, length, aspect ratio, defects, chirality and post treatment of fiber drawn. And fiber quality is also dependent on the degree of alignment during the drawing process and post treatment.

FIGS. 6A-6B show the SEM images of a SWNTs fiber that was initially drawn from a SWCNT layer on film followed by manual twisting. FIGS. 6A and 6B are SEMs images of SWNT fiber with a 60-70 μm diameter fiber. Even primitive hand-twisting significantly decreases the diameter of the CNT fibers from 400 μm to 50 μm level. The hand-twisting will bring the CNTs in closer contact to among adjacent CNTs and therefore enhances Van Der Waals forces and reduces friction among CNTs, which improves the load transfer among the CNTs. It will also affect on electrical conductivity of the fiber.

FIGS. 7A-7B show SEM images of a MWNT fiber that were initially pulled from a MWCNT coated film followed by hand twisting. FIGS. 7A and 7B are SEMs of MWNT fiber with a 50 μm Diameter. The quality of the fiber is likely associated with the thickness of the coatings (e.g., diameter of fiber) as well. It shows that elongation property varies: 160-300% for SWNT fibers and 150-190% for MWNTs fibers as shown in Table 6 below.

TABLE 6

Diameter vs. Elongation:

| Sample | Diameter, μm | Elongation, % |
|---|---|---|
| SWNT1 | 66 | 164 |
| SWNT2 | 75 | 170 |
| SWNT3 | 96 | 304 |
| MWNT1 | 102 | 150 |
| MWNT2 | 113 | 160 |
| MWNT3 | 183 | 189 |

FIGS. 8A-8B shows the test results of tensile strength and Young's modulus of a SWNT fiber made from a film coated with SWNTs for 3 minute dipping. FIG. 8A is a graph of the tensile strength and FIG. 8B is a graph of the Young's modulus of SWNT fiber prepared from SWNT coated on film. Based on our limited tests with no optimization work, we found that a SWNT fiber manually prepared, so far, gave as high as 109 MPa of tensile strength and 2.2 GPa of modulus and a MWNT fiber gave as high as 89.6 MPa and 6.3 GPa, respectively. This initial promising fiber making results with both SWNTs and MWNTs encourages us to seek for more detailed research of this new process that can be expanded for the fiber preparation of SWNTs, DWNTs, MWNTs as well as mixture thereof. The present application discloses outstanding physical properties, especially, mechanical property using this new process having the dynamic versatility of the different CNTs use. Table 7—SWNT & MWNT Fibers: Mechanical Properties from Literature.

TABLE 7

| Solution Process (SWNTs) | Process | Tensile Strength (MPa) | Young's Modulus (GPa) | Elongation (%) |
|---|---|---|---|---|
| M. Kozlov[1] | Wet Spinning (Flocculation, HCl bath) | 770 | 8.9 | 30 |
| B. Vigolo[2] | Wet Spinning (coagulation, PVA bath) | 230 | 40 | 1 |
| P. Miaudet[3] | Wet Spinning (coagulation, PVA bath) | $1.8 \times 10^3$ | 45 | 350 |
| W. Néry[4] | Wet Spinning (coagulation, PVA bath) | 540 | 5-10 | 300 |

Without the use of dispersant or polymer binder or polymer binder with CNT solution, the present application discloses various fibers not only from single-walled nanotubes (SWNTs), double-walled nanotubes (DWNTs), or multi-walled nanotubes (MWNTs) but also from the mixtures thereof with both as-synthesized and purified forms of the CNTs. The present application discloses a potential to prepare unique fibers having different composition and outstanding physical properties such as mechanical and/or electrical.

The present application discloses a method of making CNT fibers that are many times stronger per weight than the best known engineering fibers and are strong, stiff, and light-weight are critical properties required for materials for the construction of airplane, space shuttle, structures and advanced textiles, sensors, artificial muscles, electrical wire and actuators.

Previous patent application's process is based on CNT coating on flexible substrate and then release CNT layer by dipping in acid. The present application provide methods to coat a thin layer of polymer after the acid dipping followed by water rinse and air dry or to coat a thin layer of polymer on flexible substrate first and then coat CNTs on the polymer layer and then release CNT/the polymer layer (Process III) without using concentrated Sulfuric acid. We can coat CNT on non-adhesive coated flexible substrate first and coat polymer layer and release CNT layer with polymer layer to fabricate CNT composite fiber. We can also coat CNT on thin adhesive layer coated flexible substrate first followed by acid dipping and water rinse, and coat polymer layer and release CNT layer with adhesive and polymer layer to fabricate CNT composite fiber (Process II).

FIGS. 9A and 9B are images of the CNT coated (PET) film. FIG. 9B shows both SWNT and a mixture of MWNT and SWNT.

An alternative method to making the CNT coated films and/or increasing the thickness of the layers is by drop casting a solution of SWNT in a solvent to a film and allowing the solvent of the SWNT to evaporate. However, the CNTs were coated thickly but no uniformly and a thick CNT coated film is hard to make CNT fiber.

The present application also discloses removing adhesive materials through dissolving the adhesive. When CNT coated film dip in DMF, the CNT layer is separated very easily by the DMF solution, after CNT coated film dipping.

As used herein the term "Toughness" is a measure of the energy in which a sample can absorb before it breaks As used herein the term "Young's modulus (E)" is a measure of the stiffness of a given material. The Young's modulus, E, can be calculated by dividing the tensile stress by the tensile strain:

$$E \equiv \frac{\text{tensile stress}}{\text{tensile strain}} = \frac{\sigma}{\varepsilon} = \frac{F/A_0}{\Delta L/L_0} = \frac{FL_0}{A_0 \Delta L}$$

where E is the Young's modulus (modulus of elasticity) measured in pascals; F is the force applied to the object; $A_0$ is the original cross-sectional area through which the force is applied; $\Delta L$ is the amount by which the length of the object changes; $L_0$ is the original length of the object.

When coated by the evaporation method the formed coated CNT layer is thick; however, the layer is not uniformly formed and the thick CNT layer is hard to make CNT fiber because the separated film strength is too low. The heat treatment of the CNT results in a decreased diameter of CNT fiber decrease and increased strength of CNT fiber increase.

The present application also provides a method for increasing the mechanical properties of CNT fiber. The method includes a film when coated with CNTs is dipped in acid for a few seconds, soaked in NH4OH for a few minutes and then in an alcohol solvent. The CNT layer released from PET film was then fabricated into either fiber or yarn.

Provided is a method for coating a film with CNTs when dipped in acid for a few seconds, soaked in DI water for 1 minute and then dipped in 5% PVA (MW 57,000-66,000) aqueous solution for a few minutes. The CNT layer released from PET film was then fabricated into either fiber or yarn. In the present invention, the CNT layer may be pulled into a fiber or yarn. The CNT layer may be released from PET film by the addition of an acid solution that dissolves the adhesion between the PET film and the substrate. The diameter of the fiber may be controlled by the units that makeup the CNT or by the pulling or stretching of the CNT.

Mechanical Properties of SWNT, MWNT and SWNT/MWNT mixture fibers after washing with a base, NH4OH are shown in the table below:

|  | Tensile strength (GPa) | Modulus (GPa) |
|---|---|---|
| MWNT | 2.97 | 19 |
| SWNT | 1.21 | 28 |
| SWNT/MWNT | 3.85 | 13 |

In comparison, the table below illustrates the mechanical properties of SWNT, MWNT and SWNT/MWNT mixture fibers utilizing 5% PVA.

|  | Tensile strength (GPa) | Modulus (GPa) |
|---|---|---|
| MWNT | 3.1 | 61 |
| SWNT/MWMT | 2.3 | 25 |
| PVA | 0.018 | 0.067 |

The tables below illustrates the reproducibility of the polymer coated 3MPET/CNT/PVA

|  | Tensile strength (GPa) | Modulus (GPa) |
|---|---|---|
| MWNT (Sample 1) | 3.1 | 69 |
| MWNT (Sample 2) | 4.1 | 53 |
| MWNT (Sample 3) | 3.5 | 62 |
| Average | 3.6 ± 0.4 | 61.6 ± 7.5 |

|  | Tensile strength (GPa) | Modulus (GPa) |
|---|---|---|
| MWNT (Sample A) | 2.5 | 48.3 |
| MWNT (Sample B) | 2.5 | 53.3 |
| MWNT (Sample C) | 2.3 | 46.5 |
| Average | 2.4 ± 0.1 | 49.4 ± 2.6 |

FIG. 10 is a schematic of a method of preparing CNT fiber. The present application discloses a PET film coated 120 first with PVA using a 5% PVA solution 122. The film PET/PVA 124 is dipped in CNTs 126 dispersed in methanol 128 for a few minutes. The CNT layer 130 was then released from PET film 124 and rolled 132 to be fabricated into either fiber or yarn.

Figure 11:
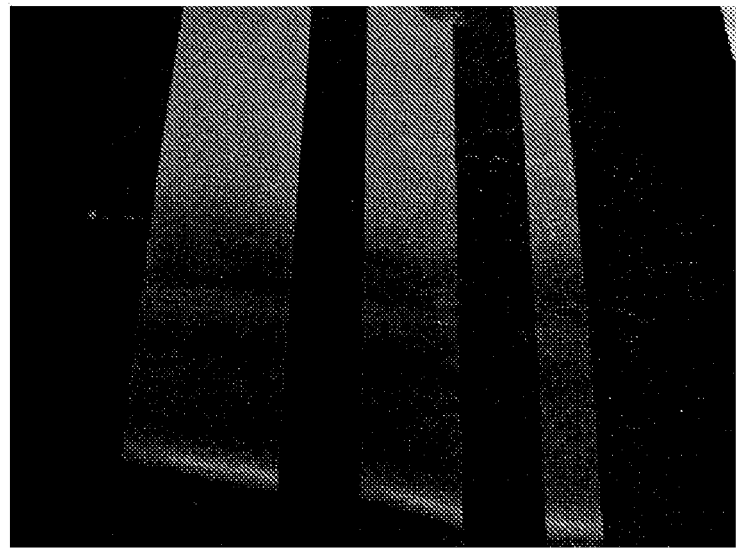
FIG. 11 is an image of 3 different strips of PET coated with 5 percent PVA.

FIG. 11 is an image of the preparation of CNT fibers of various diameters showing 3 different strips of PET coated with 5% PVA. The present application discloses a novel and versatile process for the preparation of composite-carbon nanotube (CNT) fibers/yarns with high mechanical properties. The process can be used for the preparation of various composite-CNT fibers not only from single-walled nanotubes (SWNTs), double-walled nanotubes (DWNTs), or multi-walled nanotubes (MWNTs) but also from the mixtures thereof. The process utilizes a thin-polymer (e.g., PVA: polyvinyl alcohol) layer coated on a PET film strip to provide delamination of a CNT layer coated on the PET film strip. With MWNT composite fibers prepared with this new method, mechanical properties of 84 GPa Young's modulus and 3.8 GPa tensile strength were obtained.

Carbon nanotubes (CNTs) have extremely high strength and stiffness, low density, good chemical stability, and high thermal and electrical properties. Single-walled carbon nanotubes (SWNTs) have unique properties of electrical conductivity and current-carrying capability similar to copper; a thermal conductivity higher than diamond; and a mechanical strength higher than any naturally occurring- or man-made material. Potential applications of CNTs that have been reported include hydrogen storage actuators microelectrodes and supercapacitors.

A single SWNT particle can have a theoretical-elastic modulus of 0.64 TPa and a tensile strength of 37 GPa but is too small in length to use as a fiber. Thus, CNT fibers or CNT-composite fibers once fabricated from individual particles are more useful for practical applications. There are three main processes of making fiber: a wet-solution spinning, a dry spinning solution, and a gas-state spinning solution. The wet-solution spinning uses a coagulation of aqueous carbon-nanotube dispersion and has, in general, numerous steps: first, the CNTs should be well dispersed in a solvent, which must be extracted after forming a fiber. This spinning solution is a four-step process: (i) dispersion of CNTs made with a solvent that is normally used with a surfactant; (ii) spinning the dispersion into a strong, inorganic acid (such $H_2SO_4$) or a polymer solution; (iii) upon spinning, the coagulation forms a fiber or composite fiber; and (iv) post-processing of the fiber such as stretching, washing, drying, and annealing. Jiang et al. were the first to develop a dry-spinning method by showing that multi-walled, carbon-nanotube forests can be self-assembled into fiber or yarn by being drawn out from super-aligned arrays of carbon nanotube forests on silicon wafer. Precursor material is typically a liquid-hydrocarbon feedstock with added ferrocene and thiophene. The process is continuous as the carbon fibers are spun directly from the gas phase.

Considerable efforts have been made to increase the mechanical properties of CNT by using a polymer as a matrix material. Composite fibers comprised largely of nanotubes might be obtained by a process called polyvinyl alcohol (PVA)-coagulation spinning. Dalton et al. reported a further improvement in a PVA-composite fiber by applying the spinning technique, which considerably increased fiber strength. Furthermore, a hot-drawing process for treating wet spun-composite fibers made from single- or multi-wall CNTs with a PVA improved the strength. The best performance for a CNT/PVA-composite fiber reported so far in the literature is 1.8 GPa of tensile strength with 80 GPa of modulus.

The present application discloses a process that involves: (i) dipping a thin, PVA-polymer layer coated with a polyester (PET) film strip in a CNT-dispersed solution to coat the CNTs; (ii) delaminating the CNT-coated PVA layer from the PET strip; and (iii) spinning the delaminated layer to a composite fiber by stretching with twisting followed by an oven baking. This simple process can be used for the fabrication of various composite fibers not only from SWNTs, double-walled nanotubes (DWNTs), or multi-walled nanotubes (MWNTs), but also from the mixtures thereof.

The CNT products provided by Zyvex Inc. were purified by sonicating in an oxidizing agent for 24 hours, washed with DI water and dried prior to use. The PVA 87-89% solution hydrolyzed the polymer, which had an MW of 57000-66000, and was purchased from Alfa Aesar. The other chemicals were used without further purification.

A PET filmstrip was first coated with PVA and dried at room temperature. Then, the PVA-coated strip was dipped in CNT dispersed in a methanol (or ethanol) solution. The CNT/PVA layer was then delaminated and fabricated into either fiber or yarn. Before drying, the fiber or the yarn was hand-stretched to approximately 200-600% at room temperature, depending on the width of the strip used, and then dried in an oven at 120° C. for 15 min.

Figures 12A, 12B, 12C, 12D, 12E:
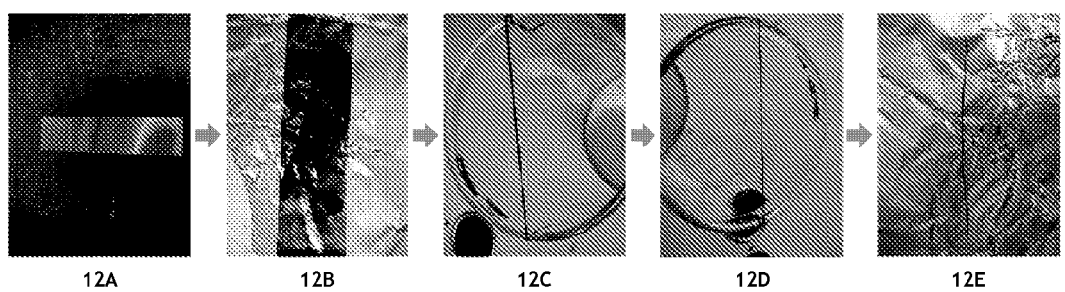
FIGS. 12A-12E show images illustrating the Composite CNT fiber preparation.

FIGS. 12A-12E shows images illustrating Composite CNT Fiber Preparation. FIG. 12A shows the picture of a PVA coated on the PET filmstrip. FIG. 12B shows the picture of MWNTs/PVA-coated layer partially delaminated. FIGS. 12C and 12D show the production of the CNT being applied by stretching with/without twisting, as the fiber was flexible and easy to manipulate. The fibers also can be knotted without breakage. FIG. 12E is an image of the final fiber. A key advantage of our process, which distinguishes it from others, is that any nanotubes (SWNTs, DWNTs, MWNTs, or mixtures thereof) can be fabricated into a composite fiber without the use of any acids. The quality of the fiber will be associated with a uniform layer of CNT thickness on the substrate and the degree of alignment that is achieved during the stretching process with twisting and post treatment.

Figures 13A, 13B, 13C, 13D:
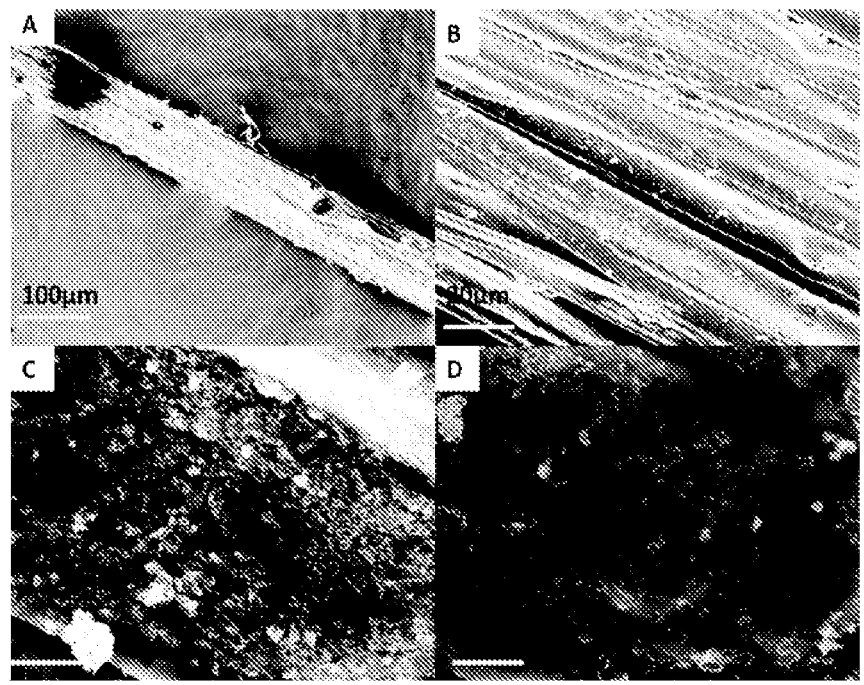
FIGS. 13A-13D are SEM images of MWNT/PVA composite fiber at different magnifications.

FIGS. 13A-13D are SEM images of MWNT/PVA composite fiber at different magnifications. FIG. 13A shows a typical SEM of a PVA/MWNT fiber. Observation at high magnification shown in FIG. 13B reveals the surface of the fiber that is free of contamination. FIGS. 13C and 13D show the embodiment and dispersion of MWNT in the PVA-polymer matrix. The intrinsic properties of the matrix polymer are also additional key factors that affect the mechanical strength of our composite fiber. Another benefit of this processing method is easy delamination of the thin PVA layer from the PET filmstrip after being dipped in a CNT dispersed-alcohol solution. Before drying the CNT coated-PVA layer delaminates, the layer needs to be hand-stretched to approximately 200-600% with/without twisting at room temperature to fabricate it into fiber or yarn. Raman spectroscopy can provide information about a material's vibrational and electronic properties. For over three decades, it has been known that the application of a mechanical strain to fibers such as carbon or Kevlar results in shifted frequencies of Raman bands that are directly related to the interatomic force constants.

Figure 14:
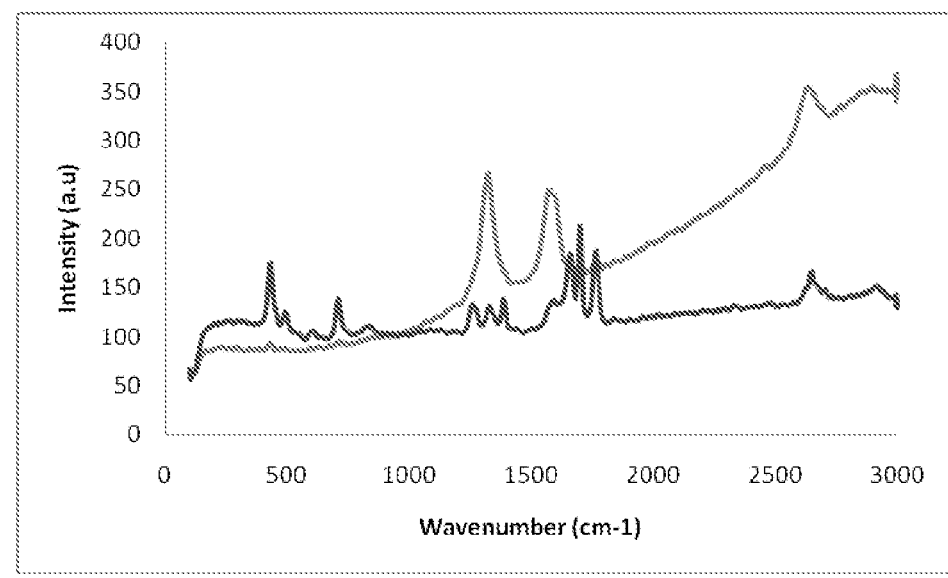
FIG. 14 is a plot of a raman spectra of pristine MWNT (blue) and MWNT/PVA composite fiber (red).

FIG. 14 is a plot of a raman spectra of pristine MWNT (blue) and MWNT/PVA composite fiber (red). The peaks of D, G and G-bands of the MWNT are still visible when the nanotubes are embedded in the PVA. By measuring several sample fibers, we found that the yarns yielded a tensile strength of 3.6±0.4 GPa and Young's modulus of 61.6±7.5 GPa. These represent the average of three different samples. One of the samples was further annealed by applying tension for 15 minutes at a temperature of 120° C.

Figure 15:
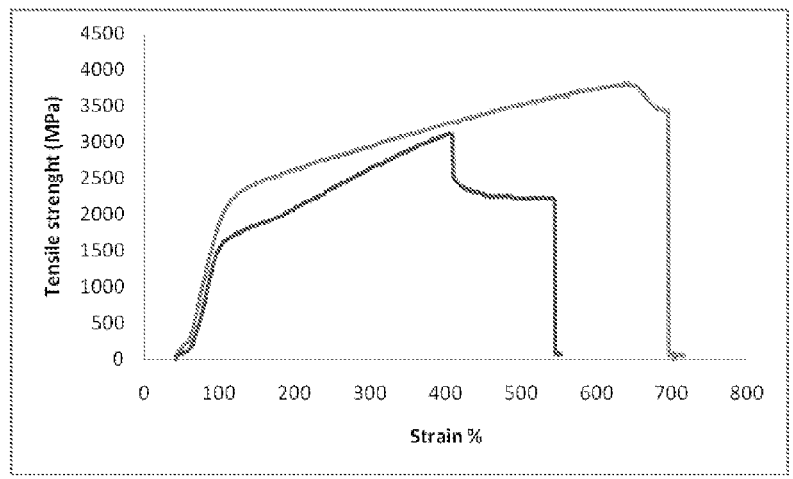
FIG. 15 is a plot of stress vs. strain of MWNT composite fiber: before annealing (red) and after annealing (blue).

FIG. 15 is a plot of stress vs. strain of MWNT composite fiber: before annealing (red) and after annealing (blue). The annealing further improved tensile strength to 3.8 GPa and the modulus to 84 GPa as shown in FIG. 15. PVA is a semi-crystal polymer having a hydroxyl group in each repeating unit and thus cross-linkable. It has been well established that the polymer morphology and structure are important factors in determining the material properties. The change of PVA crystallinity and the formation of a cross-linked PVA network achieved by the heat treatment have been found to increase the tensile strength and modulus of the fiber composite. The use of alcohol as a solvent also resulted in an improvement in the fiber strength.

Figures 16A, 16B:
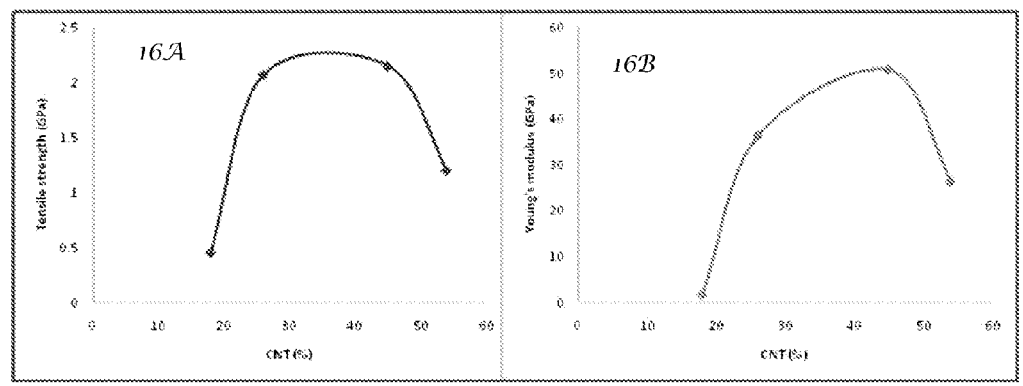
FIGS. 16A and 16B are plots of the tensile strength and Young's Modulus of composite MWNT Fibers vs. % CNT.

FIGS. 16A and 16B are plots of the tensile strength and Young's Modulus of composite MWNT Fibers vs. % CNT. The percentage of CNT content in the composite fiber affects both tensile strength and Young's modulus. The tensile strength of the CNT/PVA fiber improved from 0.3 to 3.8 GPa by increasing the MWNT content from 18 to 40%. As we increased the MWNT content higher, to 40-45%, the tensile strength decreased. This is probably due to the aggregation of a higher content of MWNT. A similar trend was also observed for the modulus. Thus, the maximum content of CNT with the PVA polymer in preparing the composite fiber for achieving the highest mechanical properties is 40-45%. The discovery of this new process leads us to perform further research to achieve the best combination of SWNTs, DWNTs and MWNTs to fabricate the best composite CNT fiber. The best composite fiber could be made by achieving a good dispersion CNT in the polymer matrix, which improves the interaction between CNTs in the matrix polymer.

The present application discloses excellent mechanical properties and uses no surfactant to disperse CNTs in an alcohol solvent. The surfactant molecules positioned at interfacial surfaces between the polymer matrix and CNTs play a role as a lubricant so no use of the surfactant molecules enhance a higher adhesion between them. The present application enables the matrix polymer to fill in the entire void among the CNTs and facilitates CNTs to be well aligned through stretching and twisting. In addition, annealing yields a crystallinity increase of the PVA molecules that also enhance mechanical properties. The Van Der Waals forces make the dispersion of CNTs in PVA polymer difficult due to the aggregation of the CNTs, which result in poor mechanical properties. If voids within the body of the fiber occur as well as a small alignment among the CNTs in the composite fiber, it will also weaken the mechanical properties. Our new process overcomes this potential weakening of mechanical properties.

The present application discloses a novel process utilizing a new fabrication concept of CNT composite fibers: by applying a thin, polymer-layer delamination of a coated with CNTs from a plastic strip (PET strip) and can also be used to produce a range of composite CNT fibers from various carbon nanotubes of SWNTs, DWNTs, MWNTS, and combinations thereof by utilizing a polymer layer such as PVA that is coated on a PET filmstrip.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, MB, BBC, AAABCCCC, CBBAAA, CABABB, and so forth. The skilled artisan will understand that typically there is no limit on the number of items or terms in any combination, unless otherwise apparent from the context.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

The invention claimed is:

1. A method of making a carbon nanotubes composite fiber yarn comprising the steps of:
   providing a polyethylene terephthalate substrate strip;
   contacting the polyethylene terephthalate substrate with a polyvinyl alcohol polymer solution to form a polyvinyl alcohol polymer thin layer on the polyethylene terephthalate substrate;
   contacting the polyvinyl alcohol polymer layer with a carbon nanotube solution;
   absorbing the carbon nanotubes into the polyvinyl alcohol polymer layer to form a carbon nanotube polyvinyl alcohol composite;
   delaminating the carbon nanotube polyvinyl alcohol composite from the polyethylene terephthalate substrate to release the carbon nanotube polyvinyl alcohol composite;
   stretching the carbon nanotube polyvinyl alcohol composite;
   spinning the carbon nanotube polyvinyl alcohol composite;
   drying the carbon nanotube polyvinyl alcohol composite; and
   annealing the carbon nanotube polyvinyl alcohol composite to form a carbon nanotube composite fiber yarn.

2. The method of claim 1, further comprising the step of spinning carbon nanotube composite fiber into a carbon nanotube composite fiber yarn.

3. The method of claim 1, further comprising the step of coating the polyvinyl alcohol polymer layer.

4. The method of claim 1, wherein the polyvinyl alcohol polymer solution has a molecular weight of at least between 50,000 and 90,000.

5. The method of claim 1, wherein the polyvinyl alcohol polymer solution is a 5% polyvinyl alcohol polymer solution with a molecular weight of at least between 50,000 and 90,000.

6. The method of claim 1, wherein the carbon nanotube solution comprises single-walled nanotubes, double-walled nanotubes, multi-walled nanotubes or a mixture thereof.

7. The method of claim 1, wherein the carbon nanotube composite fiber yarn comprises a carbon nanotube content of between 18 and 70%.

8. A method of making a carbon nanotube composite fiber comprising the steps of:
   providing a polyester strip;
   contacting the polyester substrate with a polymer solution to form a polymer layer on the polyester substrate;
   contacting the polymer layer with a carbon nanotube solution comprising carbon nanotubes;
   absorbing the carbon nanotubes into the polymer layer to form a carbon nanotube polymer composite;
   delaminating the carbon nanotube polymer composite from the polyester strip to release the carbon nanotube polymer composite;
   drawing and spinning the carbon nanotube polymer composite into a carbon nanotube polymer composite fiber yarn; and
   drying and annealing the carbon nanotube polymer composite fiber yarn.

9. The method of claim 8, further comprising the step of stretching with spinning the carbon nanotube polymer composite fiber into a carbon nanotube polymer composite fiber yarn.

10. The method of claim 8, wherein the polyester strip comprises polyethylene terephthalate.

11. The method of claim 8, wherein the polymer layer comprises polyvinyl alcohol.

12. The method of claim 8, further comprising the step of annealing the polymer layer.

13. The method according to any of claims 11, wherein the carbon nanotube solution comprises one or more single-walled nanotubes, one or more double-walled nanotubes, one or more multi-walled nanotubes or a mixture thereof.

14. The method according to any of the claims 11, wherein the carbon nanotube polymer composite fiber comprises a carbon nanotube content of between 18 and 70%.

15. A method of making a composite fiber comprising the steps of:
   contacting a polymer coated substrate with a carbon nanotube solution, wherein the carbon nanotubes are absorbed into the polymer coated substrate to form a carbon nanotube polymer composite fiber layer;
   delaminating the carbon nanotube polymer composite fiber layer from the substrate to release a carbon nanotube composite fiber layer;
   stretching and spinning the carbon nanotube composite fiber layer into a carbon nanotube polymer composite fiber yarn.

16. The method of claim 15, further comprising the step of drying and annealing the carbon nanotube polymer composite fiber yarn.

17. The method of claim 15, further comprising the step of drawing the carbon nanotube polymer composite fiber into a carbon nanotube polymer composite fiber yarn.

18. The method of claim 15, wherein the substrate comprises a polyethylene terephthalate.

19. The method of claim 15, wherein the substrate comprises polyethylene terephthalate (PET), polyethylene naphthalate (PEN), polycarbonate or thermo-plastic olefin (TPO).

20. The method of claim 15, wherein the polymer layer comprises a polyvinyl alcohol, polyimide, polyamide and polyamideimide.

21. The method of claim 15, further comprising the step of annealing the polymer layer.

22. The method of claim 15, further comprising the step of forming the polymer layer from a 5% polyvinyl alcohol polymer solution with a molecular weight of at least between 50,000 and 90,000.

23. The method of claim 15, wherein the carbon nanotube solution comprises one or more single-walled nanotubes, one or more double-walled nanotubes, one or more multi-walled nanotubes or a mixture thereof.

24. The method of claim 15, wherein the carbon nanotube fiber comprises a carbon nanotube content of between 18 and 70%.

25. The method of claim 15, further comprising the step of coating a second layer on the carbon nanotube polymer composite fiber layer, wherein the second layer comprises nanotube coats, nanofibers, polymer nanofibers, inorganic nanofibers, metal nanofibers or nano-materials, graphene nanoparticles, inorganic nanoparticles, metal nanoparticles, and multilayer nanotubes.

26. The method of claim 15, further comprising the step of absorbing a second layer into the carbon nanotube polymer composite fiber layer, wherein the second layer comprises nanotube coats, nanofibers, polymer nanofibers, inorganic nanofibers, metal nanofibers or nano-materials, graphene nanoparticles, inorganic nanoparticles, metal nanoparticles and multilayered nanotubes to form a mixed carbon nanotube polymer composite fiber yarn.

* * * * *